United States Patent
Shaw et al.

(10) Patent No.: US 9,838,284 B2
(45) Date of Patent: Dec. 5, 2017

(54) DEDICATED SOFTWARE-DEFINED NETWORKING NETWORK FOR PERFORMANCE MONITORING OF PRODUCTION SOFTWARE-DEFINED NETWORKING NETWORK

(71) Applicant: AT&T Intellectual Property I, L.P., Atlanta, GA (US)

(72) Inventors: Venson Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 104 days.

(21) Appl. No.: 14/882,526

(22) Filed: Oct. 14, 2015

(65) Prior Publication Data

US 2017/0111246 A1      Apr. 20, 2017

(51) Int. Cl.
*H04L 12/26* (2006.01)
*H04L 12/801* (2013.01)
*H04L 12/911* (2013.01)
*H04L 12/721* (2013.01)

(52) U.S. Cl.
CPC ............ *H04L 43/08* (2013.01); *H04L 47/10* (2013.01); *H04L 45/70* (2013.01); *H04L 47/70* (2013.01)

(58) Field of Classification Search
None
See application file for complete search history.

(56) References Cited

U.S. PATENT DOCUMENTS

| | | | | |
|---|---|---|---|---|
| 8,448,238 B1* | 5/2013 | Gupta | ............ | H04L 63/08 726/15 |
| 9,007,922 B1* | 4/2015 | Mittal | ............ | H04L 43/50 370/242 |
| 9,038,151 B1* | 5/2015 | Chua | ............ | H04L 45/02 709/223 |
| 9,264,375 B2* | 2/2016 | Decusatis | ............ | H04L 47/70 |
| 9,608,932 B2* | 3/2017 | DeCusatis | ............ | H04L 47/70 |
| 2013/0272305 A1* | 10/2013 | Lefebvre | ............ | H04L 47/24 370/392 |
| 2014/0029451 A1* | 1/2014 | Nguyen | ............ | H04L 43/50 370/252 |

(Continued)

OTHER PUBLICATIONS

Agarwal et al., SDN traceroute: Tracing SDN Forwarding without Changing Network Behavior, HotSDN'14, Aug. 22, 2014.

*Primary Examiner* — Bob Phunkulh
(74) *Attorney, Agent, or Firm* — Hartman & Citrin LLC

(57) ABSTRACT

According to one aspect disclosed herein, a performance monitoring SDN controller can translate an intent specified by a performance monitoring application into a flow rule and an action set to be utilized by a performance monitoring SDN element to process a packet flow received from the target SDN network. The performance monitoring SDN controller can provide the flow rule and the action set to a performance monitoring SDN element, which can receive the packet flow from the target SDN network and can analyze the packet flow in accordance with the flow rule to match the packet flow to an action included within the action set. The performance monitoring SDN element can execute the action to monitor a performance metric of the packet flow and to provide a value for the performance metric to the performance monitoring application agent, which can generate a message that includes the value.

17 Claims, 8 Drawing Sheets

(56) References Cited

U.S. PATENT DOCUMENTS

| | | | | |
|---|---|---|---|---|
| 2014/0112187 A1* | 4/2014 | Kang | H04L 43/024 | 370/253 |
| 2014/0129700 A1* | 5/2014 | Mehta | H04L 43/0817 | 709/224 |
| 2014/0280864 A1* | 9/2014 | Yin | H04L 41/12 | 709/224 |
| 2014/0280898 A1* | 9/2014 | Voit | H04L 61/00 | 709/224 |
| 2014/0337674 A1* | 11/2014 | Ivancic | H04L 43/50 | 714/43 |
| 2014/0371941 A1* | 12/2014 | Keller | H02J 13/0006 | 700/297 |
| 2015/0071108 A1* | 3/2015 | Lumezanu | H04L 43/106 | 370/253 |
| 2015/0124815 A1* | 5/2015 | Beliveau | H04L 45/7453 | 370/392 |
| 2015/0127805 A1* | 5/2015 | Htay | H04L 43/0876 | 709/224 |
| 2015/0154257 A1* | 6/2015 | Xiong | H04L 43/0876 | 707/718 |
| 2015/0163159 A1* | 6/2015 | DeCusatis | H04L 43/08 | 709/226 |
| 2015/0163162 A1* | 6/2015 | DeCusatis | H04L 43/08 | 709/224 |
| 2015/0172102 A1* | 6/2015 | DeCusatis | H04L 45/28 | 370/218 |
| 2015/0172195 A1* | 6/2015 | DeCusatis | H04L 47/10 | 370/231 |
| 2015/0188772 A1* | 7/2015 | Gasparakis | H04L 43/08 | 709/224 |
| 2015/0195178 A1* | 7/2015 | Bhattacharya | H04L 45/745 | 718/1 |
| 2015/0200803 A1* | 7/2015 | Kashyap | H04L 41/12 | 370/217 |
| 2015/0350102 A1* | 12/2015 | Leon-Garcia | H04L 41/12 | 709/226 |
| 2016/0062746 A1* | 3/2016 | Chiosi | G06F 8/35 | 717/104 |
| 2016/0149784 A1* | 5/2016 | Zhang | H04B 1/0003 | 370/229 |
| 2016/0157043 A1* | 6/2016 | Li | H04L 41/12 | 370/254 |
| 2016/0224460 A1* | 8/2016 | Bryant | G06F 8/61 | |
| 2016/0330091 A1* | 11/2016 | Narayanan | H04L 49/70 | |
| 2017/0041209 A1* | 2/2017 | Joshi | H04L 43/106 | |
| 2017/0070387 A1* | 3/2017 | Rao | H04L 41/0816 | |
| 2017/0078176 A1* | 3/2017 | Lakshmikantha | H04L 43/0852 | |
| 2017/0078183 A1* | 3/2017 | Civanlar | H04L 45/02 | |
| 2017/0078210 A1* | 3/2017 | Wang | H04L 41/0803 | |

* cited by examiner

DEDICATED SOFTWARE-DEFINED NETWORKING NETWORK FOR PERFORMANCE MONITORING OF PRODUCTION SOFTWARE-DEFINED NETWORKING NETWORK

BACKGROUND

Software-defined networking ("SDN") is an architectural framework for creating intelligent networks that are programmable, application aware, and more open. SDN provides an agile and cost-effective communications platform for handling the dramatic increase in data traffic on networks by providing a high degree of scalability, security, and flexibility. SDN provides several benefits. SDN can allow for the creation of multiple virtual network control planes on common hardware. SDN can help extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OPEN-FLOW, available from Open Networking Foundation ("ONF").

Customer-defined, on-demand cloud services and user digital experience expectations are driving planning and deployment of network function virtualization and service-centric SDN among global telecommunications service providers. Network Virtualization Platforms ("NVPs"), including some cloud platforms, are deployed in information technology ("IT") data centers and network central offices to accelerate deployment of on-demand user service and virtualized network functions ("VNFs"). An NVP is a shared virtualized infrastructure that supports multiple services and network applications.

SUMMARY

Concepts and technologies disclosed herein are directed to a dedicated SDN network for performance monitoring of a production SDN network. According to one aspect of the concepts and technologies disclosed herein, a performance monitoring system for monitoring performance of a target production SDN network ("target SDN network") can include an NVP and a performance monitoring SDN network. The NVP can include a plurality of hardware resources. The performance monitoring system includes a performance monitoring SDN element, a performance monitoring SDN controller, and a performance monitoring application agent that are executable by the plurality of hardware resources of the network virtualization platform to perform operations. In particular, the performance monitoring SDN controller can translate an intent specified by a performance monitoring application into a flow rule and an action set to be utilized by the performance monitoring SDN element to process a packet flow received from the target SDN network. The performance monitoring SDN controller can provide the flow rule and the action set to a performance monitoring SDN element. The performance monitoring SDN element can receive the packet flow from the target SDN network and can analyze the packet flow in accordance with the flow rule to match the packet flow to an action included within the action set. The performance monitoring SDN element can execute the action to monitor a performance metric of the packet flow and to provide a value for the performance metric to the performance monitoring application agent. The performance monitoring application agent can generate a message that includes the value.

In some embodiments, the performance monitoring system also includes a message broker system. In these embodiments, the performance monitoring application agent can provide, to the message broker system, the message that includes the value for the performance metric to the message broker system. The message broker system can receive the message. The message broker system also can expose an application programming interface ("API") that is callable by the performance monitoring application to obtain the value for the performance metric. The message can include an original packet in the packet flow.

In some embodiments, the message broker system can receive in-band performance data from the target SDN network. In these embodiments, the API also can be callable by the performance monitoring application to obtain the in-band performance data. The in-band performance data can include one or more in-band traces, one or more in-band logs, one or more in-band performance statistics, or any combination thereof. The in-band performance data can be received from a target SDN network application, a target SDN network controller, a target SDN element, or any combination thereof operating within the target SDN network.

In some embodiments, the performance monitoring SDN network can receive the packet flow from the target SDN network via a network analyzer that selects the packet flow from among network traffic that traverses a dummy target SDN element of the target SDN element. In some embodiments, the network analyzer includes a network tap or a switched port analyzer.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
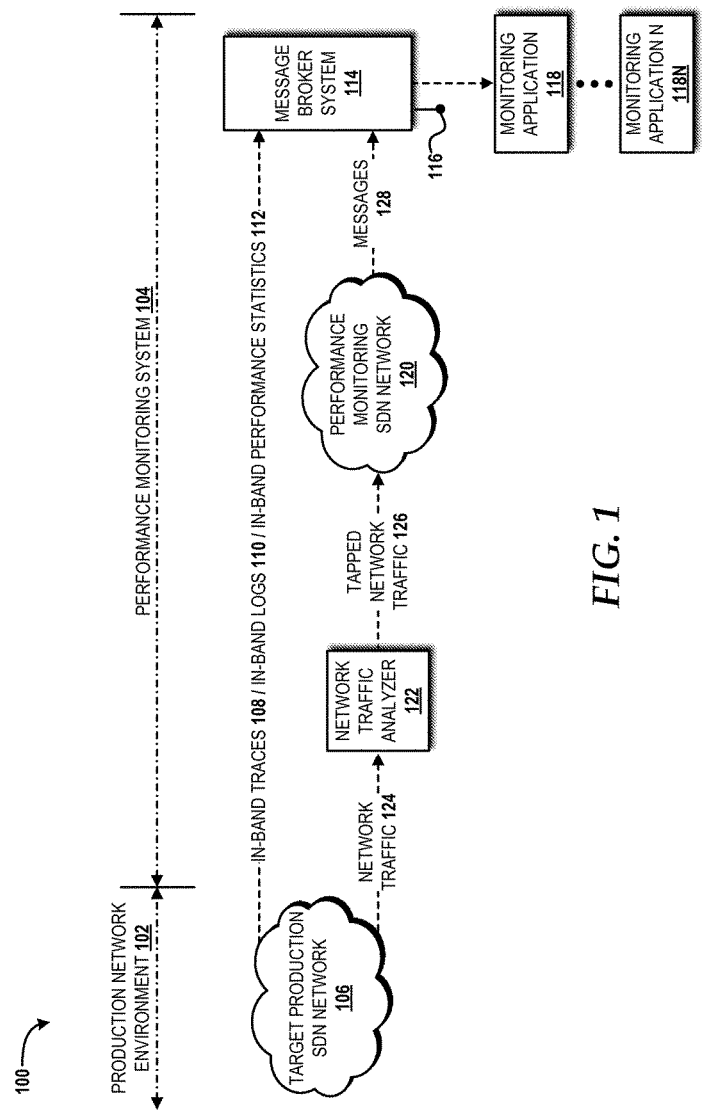
FIG. 1 is a block diagram illustrating aspects of an illustrative operating environment for implementing the various concepts and technologies disclosed herein.

Referring now to FIG. 1, aspects of an operating environment 100 for implementing various embodiments of the concepts and technologies disclosed herein will be described. The illustrated operating environment 100 includes a production network environment 102 and a performance monitoring system 104. The performance monitoring system 104 monitors performance associated with one or more production SDN networks operating within the production network environment 102.

The production SDN network(s) can be or can include any network that utilizes, at least in part, SDN concepts to provide one or more services. For example, the production SDN network(s) can be or can include a telecommunications service operator network that provides a telecommunications service (e.g., Voice over Long-Term Evolution—VoLTE) to one or more users (not shown). The production SDN network(s), for example, alternatively or additionally can be or can include one or more vendor networks associated with one or more vendors that provide service(s) to be utilized by network providers such as a telecommunications service operator in support of the service(s) provided by the operator to the end-users. Those skilled in the art will appreciate the wide range of services that can be provided, at least in part, by SDN networks, and therefore the aforementioned examples should not be construed as being limiting in any way.

The illustrated production network environment 102 includes a target production SDN network 106 (hereinafter "target SDN network 106"). The target SDN network 106 can be or can include any network type designed, built, and managed in accordance with SDN concepts to provide one or more services. It is contemplated that the production network environment 102 can include traditional networks that are designed, built, and managed in accordance with traditional, non-SDN concepts. Moreover, these networks can be configured to communicate with one or more of the production SDN networks, such as the target SDN network 106.

The performance monitoring system 104 facilitates in-band performance monitoring operations for components of the target SDN network 106 that support in-band monitoring. These components can include SDN applications, SDN controllers, and SDN network elements, including, for example, switches, routers, gateways, the like, and/or any combination thereof. The in-band performance monitoring operations can include providing in-band traces 108, in-band logs 110, in-band performance statistics 112, or any combination thereof to a message broker system 114. The in-band traces 108 can provide a detailed account of which of the SDN network elements (i.e., the path) a particular packet flow traverses towards a destination or some predefined position along a particular trace route. The in-band traces 108 can include end-to-end traces or partial traces. The in-band logs 110 can include logs of the capabilities of one or more of the SDN network elements in a given path. In addition, the in-band logs 110 can include an indication of the success or failure of a particular action taken by an SDN network element. The in-band performance statistics 112 can include, but are not limited to, bandwidth, throughput, latency, jitter, error rate, custom statistics, element-specific statistics, combinations thereof, and the like.

The message broker system 114 can expose one or more application programming interfaces ("APIs") 116 that are callable by one or more monitoring applications 118-118N to retrieve policy-mediated performance data based upon the in-band traces 108, the in-band logs 110, and the in-band performance statistics 112. The message broker system 114, in some embodiments, is provided as part of a server cluster built to provide node redundancy to respond to accidents and maintenance issues and to provide data buffering to support network outages or downstream application issues.

The illustrated performance monitoring system 104 also includes a performance monitoring SDN network 120 that performs out-of-band performance monitoring operations to monitor components of the target SDN network 106 that do not support in-band monitoring for traces, logs, and/or performance statistics. For example, physical links between dummy switches operating within the target SDN network 106 can be tapped for the performance monitoring SDN network 120 via a network traffic analyzer 122. The network traffic analyzer 122 can use traditional network taps, switched port analyzers, and/or other like features to tap at least a portion of network traffic 124 flowing across links (such as those between dummy switches) to identify tapped network traffic 126. The tapped network traffic 126 can include packet flows from one or more SDN components that are to be monitored by the performance monitoring SDN network 120.

The performance monitoring SDN network 120 can steer the tapped network traffic 126 to an appropriate one or more of the monitoring applications 118-118N via one or more messages 128 directed to the message broker system 114. For all network components operating within the target SDN network 106, the performance monitoring system 104 can collect all performance management data to allow correlation and calculations to facilitate end-to-end performance monitoring and troubleshooting for the target SDN network 106.

Figure 2:
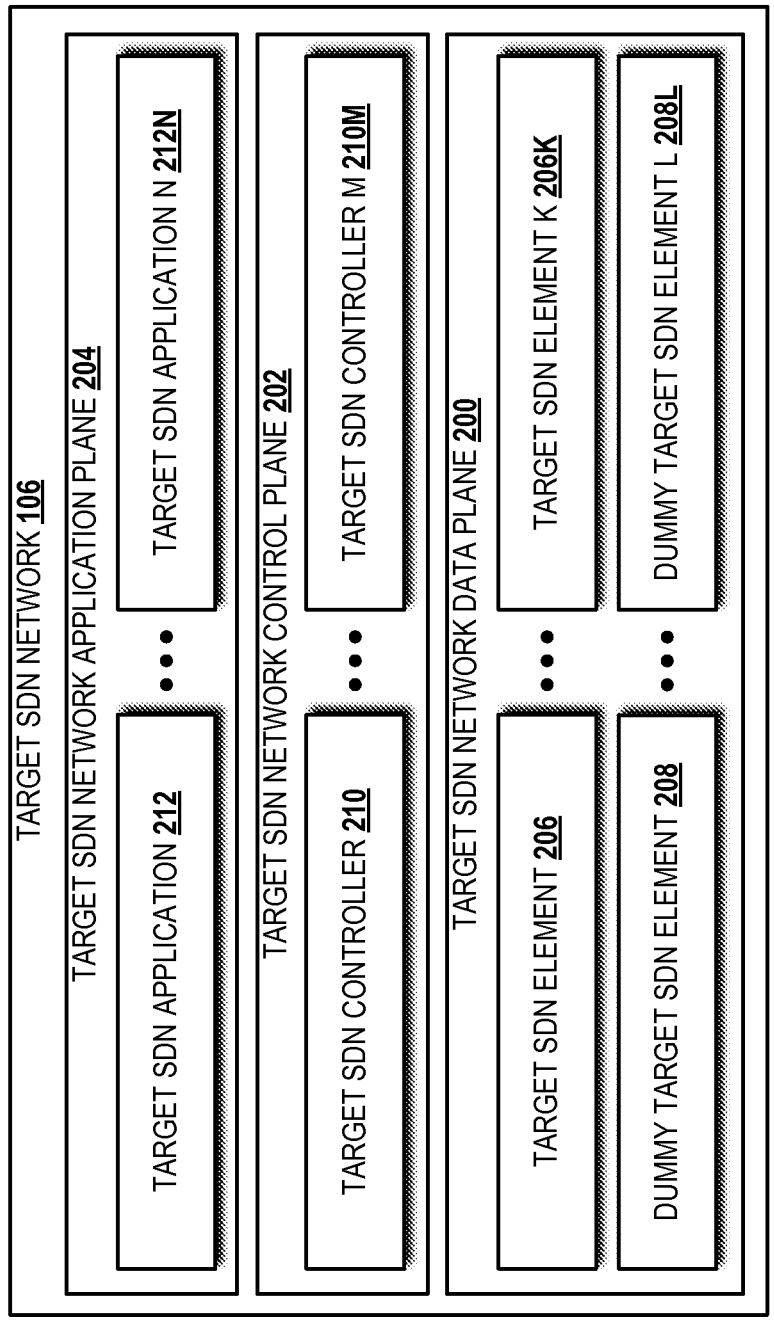
FIG. 2 is a block diagram illustrating aspects of an illustrative target SDN network for implementing various aspects of the concepts and technologies disclosed herein.

Turning now to FIG. 2, a block diagram illustrating aspects of the target SDN network 106 for implementing various aspects of the concepts and technologies disclosed herein will be described. The illustrated target SDN network 106 includes a target SDN network data plane 200, a target SDN network control plane 202, and a target SDN network application plane 204. FIG. 2 will be described with additional reference to FIG. 1.

The target SDN network data plane 200 is a network plane responsible for bearing data traffic, such as the network traffic 124. The illustrated target SDN network data plane 200 includes target SDN elements 206-206K and dummy target SDN elements 208-208L. The target SDN elements 206-206K and the dummy target SDN elements 208-208L can be or can include SDN-enabled network elements such as switches, routers, gateways, the like, or any combination thereof. The target SDN elements 206-206K differ from the dummy target SDN elements 208-208L in that the target SDN elements 206-206K have full in-band performance monitoring capabilities, including abilities to provide at least a portion of the in-band traces 108, the in-band logs 110, and the in-band performance statistics 112 directly to the message broker system 114, whereas the dummy target SDN elements 208-208L cannot provide logs such as the in-band logs 110. It is contemplated that the dummy target SDN elements 208-208L might be deficient in some other aspects of in-band performance monitoring, including, for example, being able to provide traces and/or performance statistics.

The target SDN network control plane 202 is a network plane responsible for controlling elements of the target SDN network data plane 200. The illustrated target SDN network control plane 202 includes target SDN controllers 210-210M. The target SDN controllers 210-210M are logically centralized network entities that perform operations, including translating an intent of one or more target SDN applications 212-212N operating within the target SDN network application plane 204 to rules and action sets that are useable by the target SDN elements 206-206K and/or to the dummy target SDN elements 208-208L operating within the target SDN network data plane 200.

The rules can include criterion such as, for example, switch port, VLAN ID, VLAN PCP, MAC source address, MAC destination address, Ethernet type, IP source address, IP destination address, IP ToS, IP Protocol, L4 Source Port, and L4 Destination Port. The rules can be matched to one or more actions such as, for example, an action to forward traffic to one or more ports, an action to drop one or more packets, an action to encapsulate one or more packets and forward to a controller, an action to send one or more packets to a normal processing pipeline, and an action to modify one or more fields of one or more packets. Those skilled in the art will appreciate the breadth of possible rule and action sets utilized in a particular implementation to achieve desired results. As such, the aforementioned examples should not be construed as being limiting in any way.

The illustrated target SDN network application plane 204 is a network plane responsible for providing the target SDN applications 212-212N. The target SDN applications 212-212N are programs that can explicitly, directly, and programmatically communicate network requirements/intents and desired network behavior to the target SDN controllers 210-210M.

Figure 3:
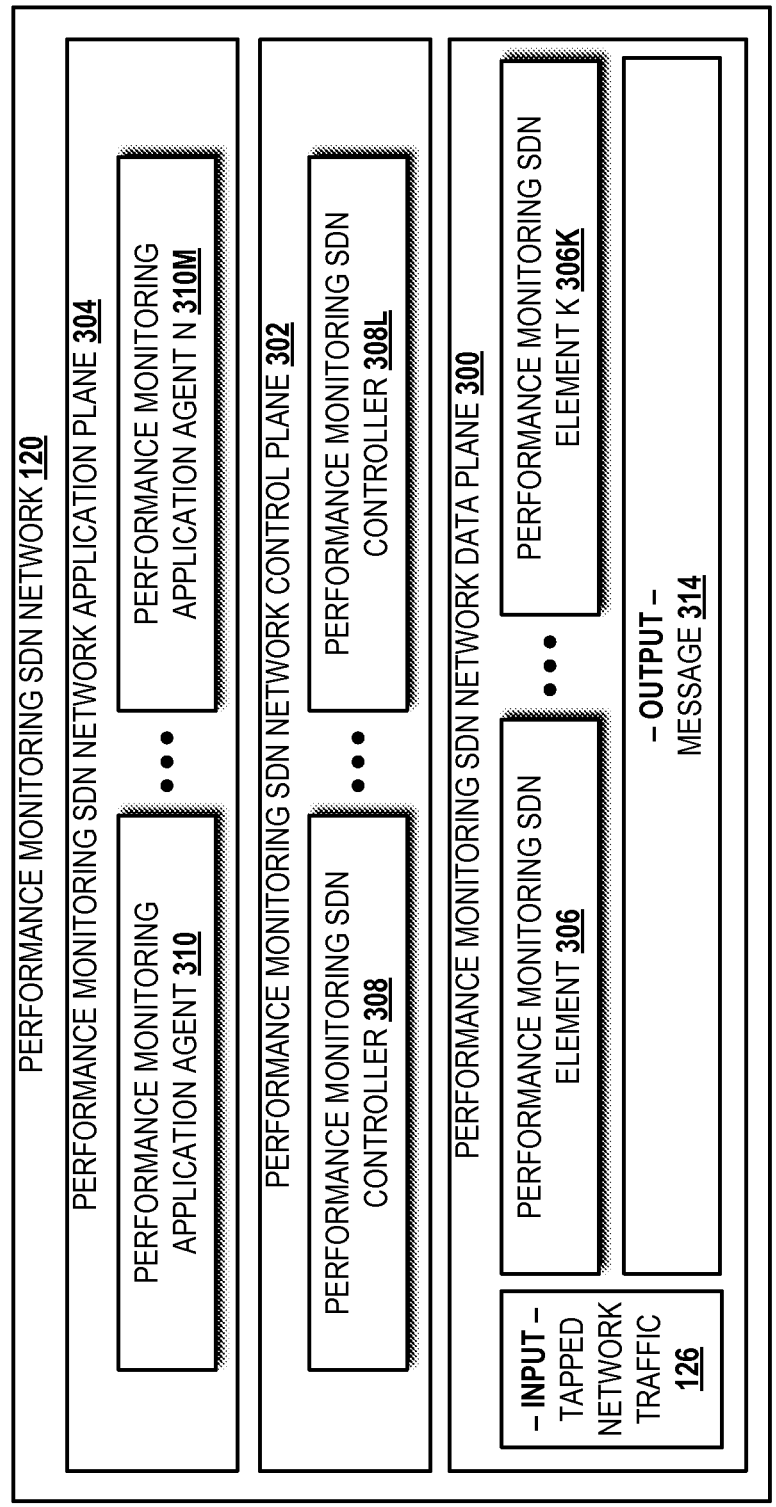
FIG. 3 is a block diagram illustrating aspects of an illustrative performance monitoring SDN network for implementing various aspects of the concepts and technologies disclosed herein.

Turning now to FIG. 3, a block diagram illustrating aspects of the performance monitoring SDN network 120 for implementing various aspects of the concepts and technologies disclosed herein will be described. The illustrated performance monitoring SDN network 120 includes a performance monitoring SDN network data plane 300, a performance monitoring SDN network control plane 302, and a performance monitoring SDN network application plane 304. FIG. 3 will be described with additional reference to FIG. 1.

The performance monitoring SDN network data plane 300 is a network plane responsible for carrying data traffic, such as the tapped network traffic 126. The illustrated performance monitoring SDN network data plane 300 includes performance monitoring SDN elements 306-306K. The performance monitoring SDN elements 306-306K can be or can include SDN-enabled network elements such as switches, routers, gateways, the like, or any combination thereof.

The performance monitoring SDN network control plane 302 is a network plane responsible for controlling elements of the performance monitoring SDN network data plane 300. The illustrated performance monitoring SDN network control plane 302 includes performance monitoring SDN controllers 308-308L. The performance monitoring SDN controllers 308-308L are logically centralized network entities that perform operations, including translating intents (also referred to herein as "requirements") of one or more performance monitoring SDN application agents 310-310M operating within the performance monitoring SDN network application plane 304 to rules and action sets that are useable by the performance monitoring SDN elements 306-306K operating within the performance monitoring SDN network data plane 300.

In particular, the performance monitoring SDN controllers 308-308L can translate an intent specified by a performance monitoring application, such as one of the monitoring applications 118 (shown in FIG. 1) and subscribed to by the performance monitoring application agents 310, into one or more flow rules and one or more action sets to be utilized by the performance monitoring SDN element 306 to process a packet flow received from the target SDN network 106, for example, in the tapped network traffic 126. The performance monitoring SDN controllers 308-308L can provide the flow rule(s) and the action set(s) to the performance monitoring SDN elements 306-306K. The performance monitoring SDN elements 306-306K can receive the packet flow from the target SDN network 106 and can analyze the packet flow in accordance with the flow rule to match the packet flow to an action included within the action set. The performance monitoring SDN elements 306-306K can execute the action to monitor a performance metric of the packet flow and to provide a value for the performance metric to an appropriate one or more of the performance monitoring application agents 310. The performance monitoring application agent 310 can generate output including a message 314 (e.g., as one of the messages 128) that includes the value and can send the message to the message broker system 114.

Figure 4:
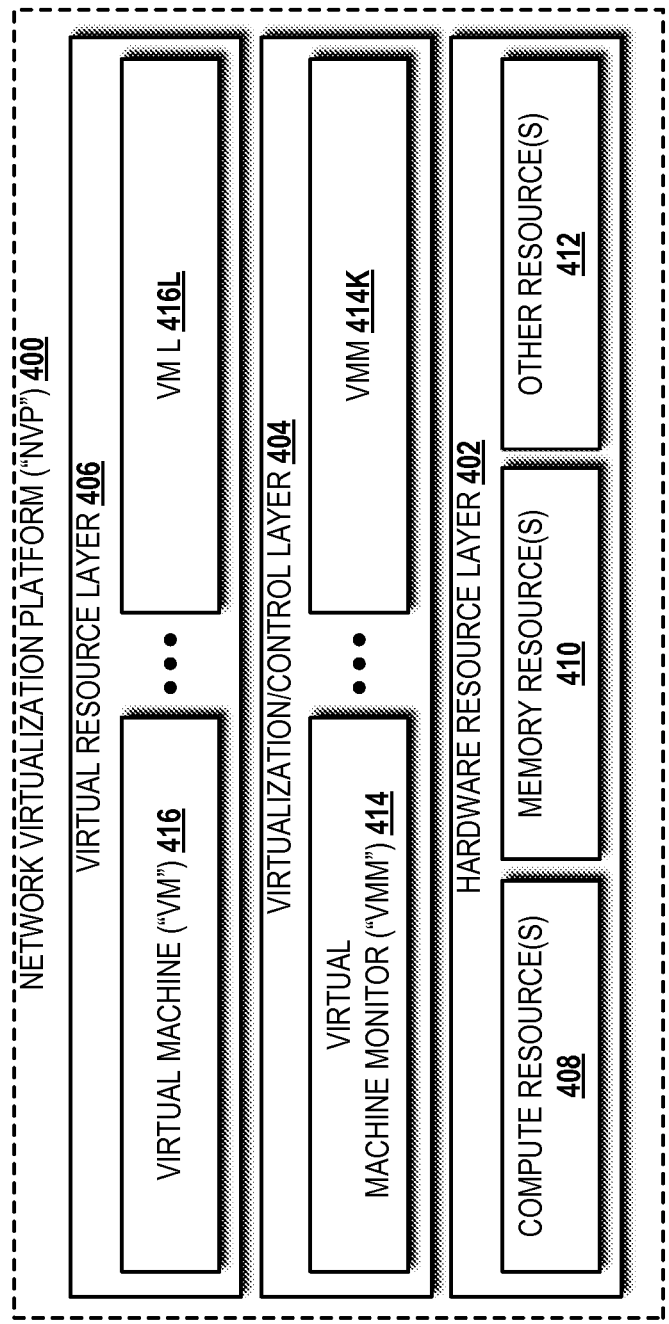
FIG. 4 is a block diagram illustrating aspects of an illustrative NVP for implementing various aspects of the concepts and technologies disclosed herein.

Turning now to FIG. 4, a network virtualization platform ("NVP") 400 will be described, according to an exemplary embodiment. The architecture of the NVP 400 can be used to implement the target SDN network 106 and the performance monitoring SDN network 120. The NVP 400 is a shared infrastructure that can support multiple services and network applications. The illustrated NVP 400 includes a hardware resource layer 402, a virtualization/control layer 404, and a virtual resource layer 406 that work together to perform operations as will be described in detail herein.

The hardware resource layer 402 provides hardware resources, which, in the illustrated embodiment, include one or more compute resources 408, one or more memory resources 410, and one or more other resources 412. The compute resource(s) 408 can include one or more hardware components that perform computations to process data, and/or to execute computer-executable instructions of one or more application programs, operating systems, and/or other software. The compute resources 408 can include one or more central processing units ("CPUs") configured with one or more processing cores. The compute resources 408 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 408 can include one or more discrete GPUs. In some other embodiments, the compute resources 408 can include CPU and GPU components that are configured in accordance with a co-processing CPU/GPU computing model, wherein the sequential part of an application executes on the CPU and the computationally-intensive part is accelerated by the GPU. The compute resources 408 can include one or more system-on-chip ("SoC") components along with one or more other components, including, for example, one or more of the memory resources 410, and/or one or more of the other resources 412. In some embodiments, the compute resources 408 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 408 can be or can include one or more hardware components architected in accordance with an ARM architecture, available for license from ARM HOLDINGS of Cambridge, United Kingdom. Alternatively, the compute resources 408 can be or can include one or more hardware components architected in accordance with an x86 architecture, such an architecture available from INTEL CORPORATION of Mountain View, Calif., and others. Those skilled in the art will appreciate the implementation of the compute resources 408 can utilize various computation architectures, and as such, the compute resources 408 should not be construed as being limited to any particular computation architecture or combination of computation architectures, including those explicitly disclosed herein.

The memory resource(s) 410 can include one or more hardware components that perform storage operations, including temporary or permanent storage operations. In some embodiments, the memory resource(s) 410 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 408.

The other resource(s) 412 can include any other hardware resources that can be utilized by the compute resources(s) 408 and/or the memory resource(s) 410 to perform operations described herein. The other resource(s) 412 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 402 can be virtualized by one or more virtual machine monitors ("VMMs") 414-414$k$ (also known as "hypervisors"; hereinafter "VMMs 414") operating within the virtualization/control layer 404 to manage one or more virtual resources that reside in the virtual resource layer 406. The VMMs 414 can be or can include software, firmware, and/or hardware that alone or in combination with other software, firmware, and/or hardware, manages one or more virtual resources operating within the virtual resource layer 406.

The virtual resources operating within the virtual resource layer 406 can include abstractions of at least a portion of the compute resources 408, the memory resources 410, the other resources 412, or any combination thereof. These abstractions are referred to herein as virtual machines ("VMs"). In the illustrated embodiment, the virtual resource layer 406 includes VMs 416-416L (hereinafter "VMs 416"). Each of the VMs 416 can execute one or more applications.

Figure 5:
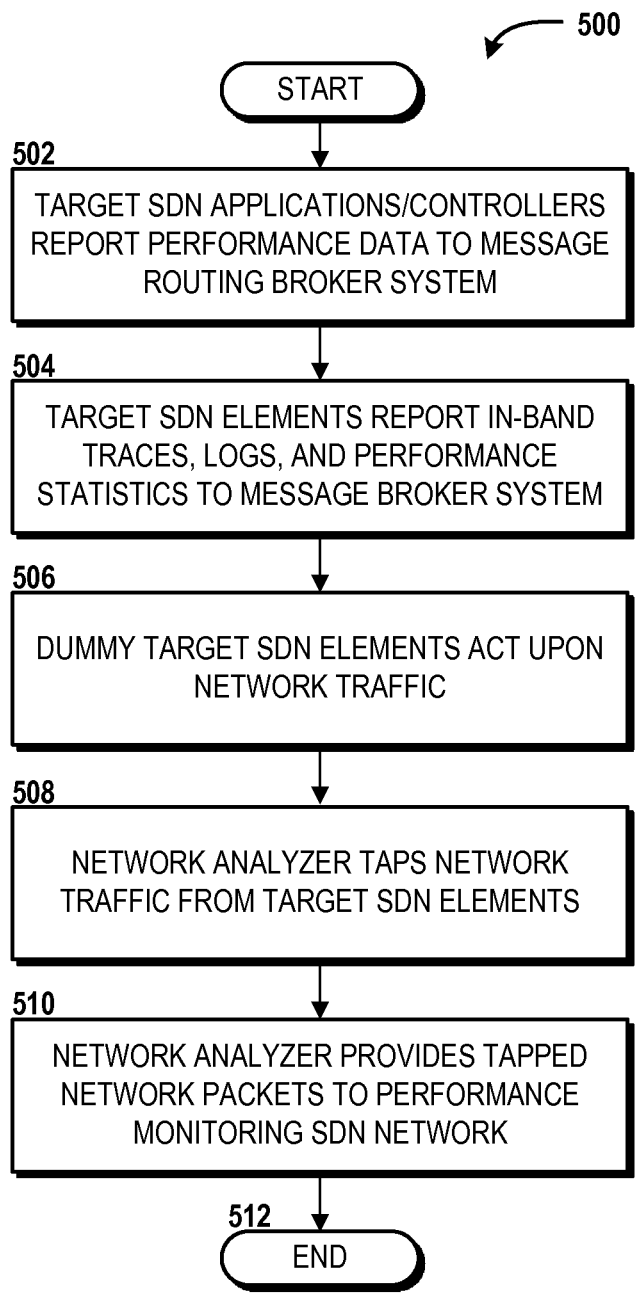
FIG. 5 is a flow diagram illustrating aspects of a method for operating a target SDN network, according to an illustrative embodiment.

Turning now to FIG. 5, aspects of a method 500 for operating a target SDN network, such as the target SDN network 106, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the NVP 400, such as one or more of the compute resources 408, and/or a processor one or more other computing systems and/or devices disclosed herein to perform operations.

For purposes of illustrating and describing some of the concepts of the present disclosure, the methods disclosed herein are described as being performed, at least in part, by one or more of the target SDN elements 206, one or more dummy target SDN elements 208, one or more target SDN controllers 210, one or more target SDN applications 212, one or more of the performance monitoring SDN elements 306, one or more of the performance monitoring SDN controllers 308, one or more of the performance monitoring application agents 310 via execution by at least a portion of the plurality of hardware resources operating in the hardware resource layer 402 of the NVP 400. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 will be described with reference to FIG. 5 and further reference to FIGS. 1-4. The method 500 begins at operation 502, where one or more of the target SDN applications 212 and one or more of the target SDN controllers 210 report performance data, such as at least a portion of the in-band traces 108, the in-band logs 110, the in-band performance statistics 112, or some combination thereof, to the message broker system 114. From operation 502, the method 500 proceeds to operation 504, where one or more of the target SDN elements 206 reports performance data, such as at least a portion of the in-band traces 108, the in-band logs 110, the in-band performance statistics 112, or some combination thereof, to the message broker system 114.

From operation 504, the method 500 proceeds to operation 506, where the dummy target SDN elements 208 act upon the network traffic 124 in accordance with instructions received from the target SDN controllers 210. From operation 506, the method 500 proceeds to operation 508, where the network traffic analyzer 122 taps the network traffic 124 from the target SDN elements 206. From operation 508, the method 500 proceeds to operation 510, where the network traffic analyzer 122 provides the tapped network traffic 126 to the performance monitoring SDN network 120. From operation 510, the method 500 proceeds to operation 512, where the method 500 ends.

Figure 6:
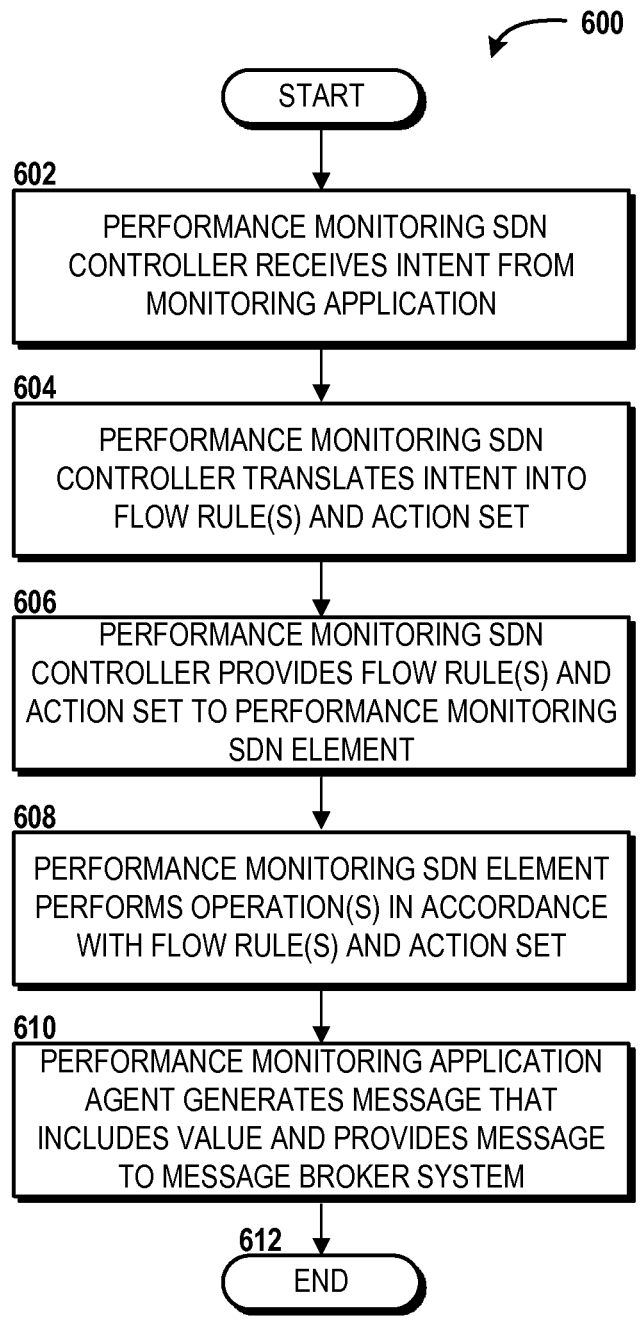
FIG. 6 is a flow diagram illustrating aspects of a method for monitoring performance of a production SDN network, according to an illustrative embodiment.

Turning now to FIG. 6, a method 600 for monitoring performance of a production SDN network, such as the target SDN network 106, will be described, according to an illustrative embodiment. The method 600 will be described with reference to FIG. 6 and further reference to FIGS. 1-4. The method 600 begins and proceeds to operation 602, where the performance monitoring SDN controller 308 receives an intent from one or more of the monitoring applications 118 via one or more of the performance monitoring application agents 310. The intent can include one or more requirements of the monitoring application(s) 118.

From operation 602, the method 600 proceeds to operation 604, where the performance monitoring SDN controller 308 translates the intent into one or more flow rules and/or one or more actions (collectively an "action set") to be utilized by the performance monitoring SDN element 306 to process a packet flow of the tapped network traffic 126 received from the target SDN network 106 via the network traffic analyzer 122 for an appropriate one or more of the performance monitoring application agents 310.

From operation 604, the method 600 proceeds to operation 606, where the performance monitoring SDN controller 308 provides the flow rules(s) and the action set to the performance monitoring SDN element 306. From operation 606, the method 600 proceeds to operation 608, where the performance monitoring SDN element 306 performs one or more operations in accordance with the flow rule(s) and the action set. In particular, the performance monitoring SDN network 306 can analyze the packet flow in accordance with the flow rule to match the packet flow to an action included within the action set. The performance monitoring SDN element 306 also can execute the action to monitor a performance metric of the packet flow and to provide a value for the performance metric to the performance monitoring application agent 310. From operation 608, the method 600 proceeds to operation 610, where the performance monitoring application agent 310 generates a message, such as the message 314, including the value for the performance metric and provides the message 314 to the message broker system 114. From operation 610, the method 600 proceeds to operation 610, where the method 600 ends.

Figure 7:
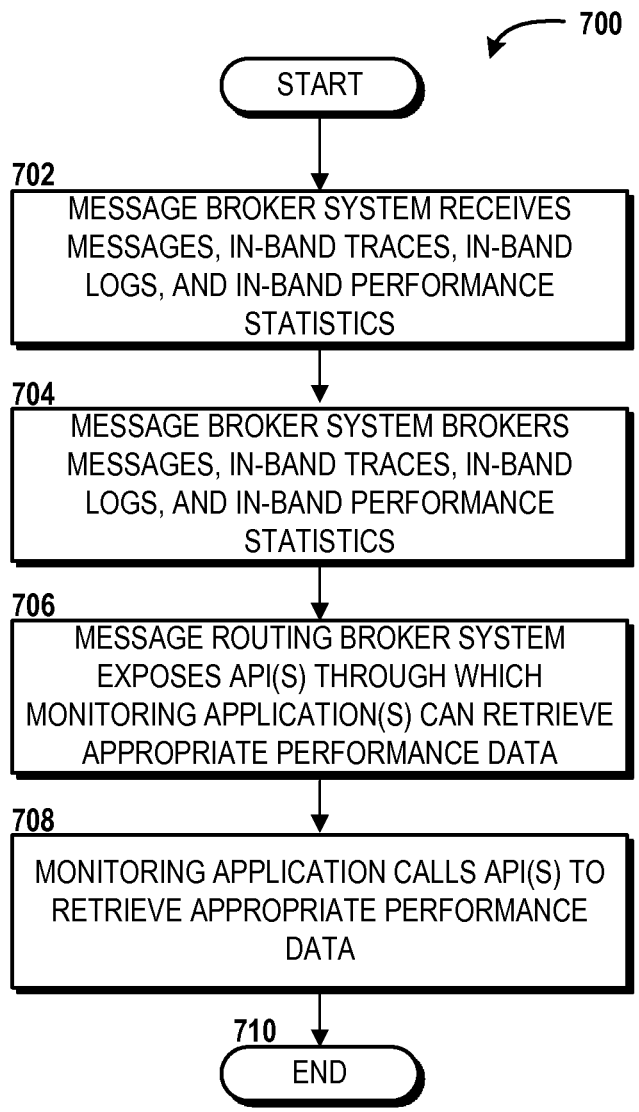
FIG. 7 is a flow diagram illustrating aspects of a method for brokering messages, according to an illustrative embodiment.

Turning now to FIG. 7, a method 700 for brokering messages will be described in detail, according to an illustrative embodiment. The method 700 will be described with reference to FIG. 7 and further reference to FIGS. 1-4. The method 700 begins and proceeds to operation 702, where the message broker system 114 receives the messages 128 from the performance monitoring SDN network 120 and the in-band traces 108, the in-band logs 110, and the in-band performance statistics 112 from the target SDN network 120. From operation 702, the method 700 proceeds to operation 704, where the message broker system 114 brokers the messages 128, the in-band traces 108, the in-band logs 110, and the in-band performance statistics 112 (collectively, performance data). From operation 704, the method 700 proceeds to operation 706, where the message broker system exposes the API(s) 116 to access the performance data so that the monitoring applications 118 can retrieve the appropriate performance data to satisfy the intent previously specified to the corresponding monitoring application agents. From operation 706, the method 700 proceeds to operation 708, where the monitoring application 118 calls the API(s) 116 to retrieve the appropriate performance data needed. From operation 708, the method 700 proceeds to operation 710, where the method 700 ends.

Figure 8:
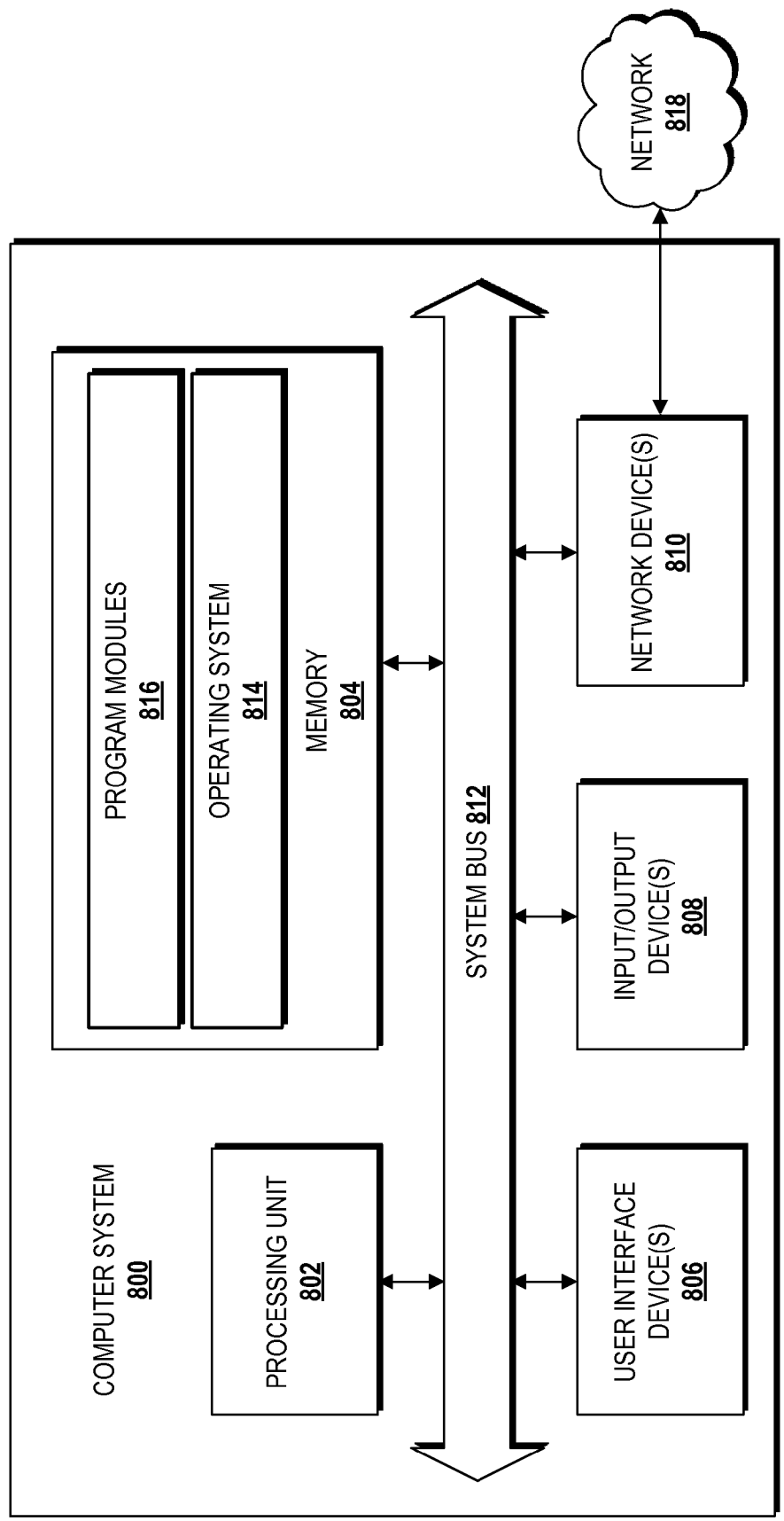
FIG. 8 is a block diagram illustrating an example computer system capable of implementing aspects of the embodiments presented herein.

FIG. 8 is a block diagram illustrating a computer system 800 configured to provide the functionality in accordance with various embodiments of the concepts and technologies disclosed herein. In some implementations, at least a portion of the hardware resources in the hardware resource layer 400 (best illustrated in FIG. 4) are provided, at least in part, by one or more host server computers (collectively, "host server cluster") is configured like the architecture of the computer system 800. It should be understood, however, that modification to the architecture may be made to facilitate certain interactions among elements described herein. In some implementations, the compute resources 408, the memory resources 410, and/or the other resources 412 are configured like the architecture of the computer system 800 or portions thereof.

The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 408 can include one or more instances of the processing units 802.

The memory 804 communicates with the processing unit 802 via the system bus 812. In some embodiments, the memory 804 is operatively connected to a memory controller (not shown) that enables communication with the processing unit 802 via the system bus 812. The memory resources 410 can include one or more instances of the memory 804. The illustrated memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein. For example, the program modules can include the target SDN elements 206, the dummy target SDN elements 208, the target SDN controllers 210, the target SDN applications 212, the performance monitoring SDN elements 306, the performance monitoring SDN controller 308, the performance monitoring application agents 310, or some combination thereof. The program modules 816 and/or other programs can be embodied in computer-readable media containing instructions that, when executed by the processing unit 802, perform various operations such as those described herein. According to embodiments, the program modules 816 may be embodied in hardware, software, firmware, or any combination thereof.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, PDAs, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network 818. Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 818 may be a wired network such as, but not limited to, a Wide Area Network ("WAN"), a wired Personal Area Network ("PAN"), or a wired Metropolitan Area Network ("MAN"). The network 818 may be any other network described herein.

Based on the foregoing, it should be appreciated that concepts and technologies disclosed herein are directed to a dedicated SDN network for performance monitoring of a production SDN network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A performance monitoring system for monitoring performance of a target software-defined networking network, the performance monitoring system comprising:
a message broker system;
a network virtualization platform comprising a plurality of hardware resources; and
a performance monitoring software-defined networking network comprising a performance monitoring software-defined networking element, a performance monitoring software-defined networking controller, and a performance monitoring application agent that are executable by the plurality of hardware resources of the network virtualization platform to perform operations comprising
translating, by the performance monitoring software-defined networking controller, an intent specified by a performance monitoring application into a flow rule and an action set to be utilized by a performance monitoring software-defined networking element to process a packet flow received from the target software-defined networking network,
providing, by the performance monitoring software-defined networking controller, the flow rule and the action set to the performance monitoring software-defined networking element,
receiving, by the performance monitoring software-defined networking element, the flow rule and the action set from the performance monitoring software-defined networking controller and the packet flow from the target software-defined networking network,
analyzing, by the performance monitoring software-defined networking element, the packet flow in accordance with the flow rule to match the packet flow to an action comprised within the action set,
executing, by the performance monitoring software-defined networking element, the action to monitor a performance metric of the packet flow received from the target software-defined networking network and to provide a value for the performance metric to the performance monitoring application agent,
receiving, by the performance monitoring application agent, the value for the performance metric,
generating, by the performance monitoring application agent, a message comprising the value for the performance metric, and
providing, by the performance monitoring application agent, the message to the message broker system; and
wherein the message broker system performs message broker system operations comprising
receiving, from the performance monitoring application agent, the message comprising the value for the performance metric, and
exposing, by the message broker system, an application programming interface that is callable by the performance monitoring application to obtain the value for the performance metric.

2. The performance monitoring system of claim 1, wherein the message broker system operations further comprise receiving in-band performance data from the target software-defined networking network; and wherein the application programming interface is also callable by the performance monitoring application to obtain the in-band performance data.

3. The performance monitoring system of claim 2, wherein the in-band performance data comprises data selected from a group of data comprising an in-band trace, an in-band log, and an in-band performance statistic.

4. The performance monitoring system of claim 3, wherein the in-band performance data is received from a target software-defined networking network application, a target software-defined networking network controller, or a target software-defined networking element.

5. The performance monitoring system of claim 1, wherein receiving, by the performance monitoring software-defined networking element, the packet flow from the target software-defined networking network comprises receiving, by the performance monitoring software-defined networking element, the packet flow from the target software-defined networking network via a network analyzer that selects the packet flow from among network traffic that traverses a dummy target software-defined networking element of the target software-defined networking network.

6. The performance monitoring system of claim 1, wherein the message comprises an original packet in the packet flow.

7. A method comprising:
translating, by a performance monitoring software-defined networking controller of a performance monitoring system via execution by at least a portion of a plurality of hardware resources of a network virtualization platform, an intent specified by a performance monitoring application into a flow rule and an action set to be utilized by a performance monitoring software-defined networking element to process a packet flow received from a target software-defined networking network;
providing, by the performance monitoring software-defined networking controller, the flow rule and the action set to the performance monitoring software-defined networking element;
receiving, by the performance monitoring software-defined networking element, the flow rule and the action set from the performance monitoring software-defined networking controller and the packet flow from the target software-defined networking network;
analyzing, by the performance monitoring software-defined networking element, the packet flow in accordance with the flow rule to match the packet flow to an action comprised within the action set;
executing, by the performance monitoring software-defined networking element, the action to monitor a performance metric of the packet flow received from the target software-defined networking network and to provide a value for the performance metric to a performance monitoring application agent;
receiving, by the performance monitoring application agent, the value for the performance metric;
generating, by the performance monitoring application agent, a message comprising the value for the performance metric;
providing, by the performance monitoring application agent, the message to a message broker system;
receiving, by the message broker system, from the performance monitoring application agent, the message comprising the value for the performance metric; and
exposing, by the message broker system, an application programming interface that is callable by the performance monitoring application to obtain the value for the performance metric.

8. The method of claim 7, further comprising receiving in-band performance data from the target software-defined networking network; and wherein the application programming interface is also callable by the performance monitoring application to obtain the in-band performance data.

9. The method of claim 8, wherein the in-band performance data comprises data selected from a group of data comprising an in-band trace, an in-band log, and an in-band performance statistic.

10. The method of claim 9, wherein the in-band performance data is received from a target software-defined networking network application, a target software-defined networking network controller, or a target software-defined networking element.

11. The method of claim 7, wherein receiving, by the performance monitoring software-defined networking element, the packet flow from the target software-defined networking network comprises receiving, by the performance monitoring software-defined networking element, the packet flow from the target software-defined networking network via a network analyzer that selects the packet flow from among network traffic that traverses a dummy target software-defined networking element of the target software-defined networking network.

12. The method of claim 7, wherein the message comprises an original packet in the packet flow.

13. A computer-readable storage medium having instructions for a performance monitoring system stored thereon that, when executed by a compute resource of a network virtualization platform, cause the performance monitoring system to perform operations comprising:
  translating, by a performance monitoring software-defined networking controller of the performance monitoring system, an intent specified by a performance monitoring application into a flow rule and an action set to be utilized by a performance monitoring software-defined networking element to process a packet flow received from a target software-defined networking network;
  providing, by the performance monitoring software-defined networking controller, the flow rule and the action set to the performance monitoring software-defined networking element;
  receiving, by the performance monitoring software-defined networking element of the performance monitoring system, the flow rule and the action set from the performance monitoring software-defined networking controller and the packet flow from the target software-defined networking network;
  analyzing, by the performance monitoring software-defined networking element, the packet flow in accordance with the flow rule to match the packet flow to an action comprised within the action set;
  executing, by the performance monitoring software-defined networking element, the action to monitor a performance metric of the packet flow received from the target software-defined networking network and to provide a value for the performance metric to a performance monitoring application agent of the performance monitoring system;
  receiving, by the performance monitoring application agent, the value for the performance metric;
  generating, by the performance monitoring application agent, a message comprising the value for the performance metric;
  providing, by the performance monitoring application agent, the message to a message broker system of the performance monitoring system;
  receiving, by the message broker system, from the performance monitoring application agent, the message comprising the value for the performance metric; and
  exposing, by the message broker system, an application programming interface that is callable by the performance monitoring application to obtain the value for the performance metric.

14. The computer-readable storage medium of claim 13, wherein the operations further comprise receiving in-band performance data from the target software-defined networking network; and wherein the application programming interface is also callable by the performance monitoring application to obtain the in-band performance data.

15. The computer-readable storage medium of claim 14, wherein the in-band performance data comprises data selected from a group of data comprising an in-band trace, an in-band log, and an in-band performance statistic.

16. The computer-readable storage medium of claim 15, wherein the in-band performance data is received from a target software-defined networking network application, a target software-defined networking network controller, or a target software-defined networking element.

17. The computer-readable storage medium of claim 13, wherein receiving, by the performance monitoring software-defined networking element, the packet flow from the target software-defined networking network comprises receiving, by the performance monitoring software-defined networking element, the packet flow from the target software-defined networking network via a network analyzer that selects the packet flow from among network traffic that traverses a dummy target software-defined networking element of the target software-defined networking network.

* * * * *